United States Patent [19]
Kikinis

[11] Patent Number: 5,515,510
[45] Date of Patent: May 7, 1996

[54] COMMUNICATIONS INTERNETWORK SYSTEM CONNECTING A CLIENT NODE ARRAY TO A RESOURCE ARRAY

[75] Inventor: Dan Kikinis, Saratoga, Calif.

[73] Assignee: Consilium Overseas Limited, Geneva, Switzerland

[21] Appl. No.: 182,282

[22] Filed: Jan. 14, 1994

[51] Int. Cl.⁶ .................................................. G06F 15/173
[52] U.S. Cl. .................................... 395/200.02; 370/94.3; 395/200.15
[58] Field of Search .......................... 370/94.3; 395/200, 395/325, 200.02, 200.15

[56] References Cited

U.S. PATENT DOCUMENTS

| | | | |
|---|---|---|---|
| 3,912,353 | 10/1975 | Kasuya et al. | 339/75 |
| 4,901,205 | 2/1990 | Landis et al. | 361/424 |
| 4,991,000 | 2/1991 | Bone et al. | 357/75 |
| 5,134,690 | 7/1992 | Samatham | 395/200.01 |
| 5,167,035 | 11/1992 | Mann et al. | 395/575 |
| 5,175,733 | 12/1992 | Nugent | 370/94.3 |
| 5,367,521 | 11/1994 | Sanchez et al. | 370/60 |

Primary Examiner—Ken S. Kim
Attorney, Agent, or Firm—Donald R. Boys

[57] ABSTRACT

An interconnection topography for microprocessor-based communication nodes consists of opposite arrays of client nodes and resource nodes, with each client node connected to one resource node by a data transfer link, each resource node connected to a resource trunk by a data transfer link, and each node connected to just four neighboring nodes by data transfer links. Communication nodes in the topography are microprocessor controlled, and comprise random access memory and data routing circuitry interfaced to the data transfer links. In one aspect resource nodes are provided with a map of the interconnection topography for use in routing data. In another aspect, individual ones of the communication nodes are programmed as servers for receiving client requests and scheduling routing of resource data.

13 Claims, 6 Drawing Sheets

COMMUNICATIONS INTERNETWORK SYSTEM CONNECTING A CLIENT NODE ARRAY TO A RESOURCE ARRAY

FIELD OF THE INVENTION

This invention is in the area of computerized network communication systems, and pertains more specifically to massively parallel network architecture.

BACKGROUND OF THE INVENTION

Typically, large client-server computer network systems exhibit topology having a single file server that acts as the center of the system's operations. The file-server is usually based on a microprocessor, and is dedicated to handling large data manipulation and flow as requested by a number of clients. Clients, or client nodes, may be a number of different electronic devices including but not limited to: desktop workstations, personal computers, mainframe or minicomputers, telecommunication equipment and dumb terminals. System resources are typically provided by large electronic storage devices associated with the file server. These resources include data, application programs for clients, and the network operating system. The file server, operating according to the network operating system, performs traffic management functions and provides security for the data. The file server also performs information retrieval and may do computations or specific record searches within a database.

Client nodes and file servers in computerized networks such as Ethernet, ARCnet and AppleTalk must be connected via a transmission medium, commonly some form of cabling. The physical layout (topology) of a large client-server network routes all client requests to the file server. Conventional bus systems limit the number of direct connections. To maintain an acceptable degree of connectivity such networks typically employ a hub or concentrator connection as a subsystem. The hub serves as a junction box for connected nodes and passes the data between client and file server by a separate dedicated network trunk. Large network systems may have layered hubs to provide connectivity to more nodes while still using a single file server.

The file server is limited by the bus connection to a conventional network during periods of heavy client use. As demand increases, data throughput to and from clients saturates, and system performance is limited. To maintain acceptable performance, conventional networks have incorporated second level servers that perform limited functions of the primary server and eliminate waiting by clients in some cases. Typically, data is stored separate from the primary server and later, at a convenient time, such as once a day or perhaps as often as once an hour, the secondary server downloads to the primary file server. In these systems, real time operation is not possible. Also, at higher demand the bus systems for both the second-level servers as well as the primary server saturate, and system-wide performance is again limited.

What is needed is a computer network architecture that maintains substantially real time performance for large numbers of clients and resources.

SUMMARY OF THE INVENTION

A communication internetwork for connecting client stations with resources is provided, comprising a client array of communication nodes each connectable by data transfer link to one or more client stations, and a resource array of communication nodes having the same number of nodes as the client array, each resource node connectable by data transfer link to one or more resources. In the topography of the invention each node in each array is connected by data transfer link to just one node in the opposite array, and to just four nodes in the same array.

The unique topography, which may be arranged as nested toroids, provides a minimum of interconnection for the maximization of alternative communication pathways resulting.

Data transfer linking may be accomplished in a variety of ways, depending on the use of the network. In closely coupled networks, parallel buses are used between nodes, and in more remote connections serial links may be preferred. Optical fiber data transfer links are also provided where advantageous and economic.

In one aspect of the invention an apparatus is provided with an enclosure having external connectors interfaced to internal nodes, with the internal nodes implemented as single-chip devices, packaged and mounted to printed circuit boards.

DESCRIPTION OF THE PREFERRED EMBODIMENTS

Figure 1:
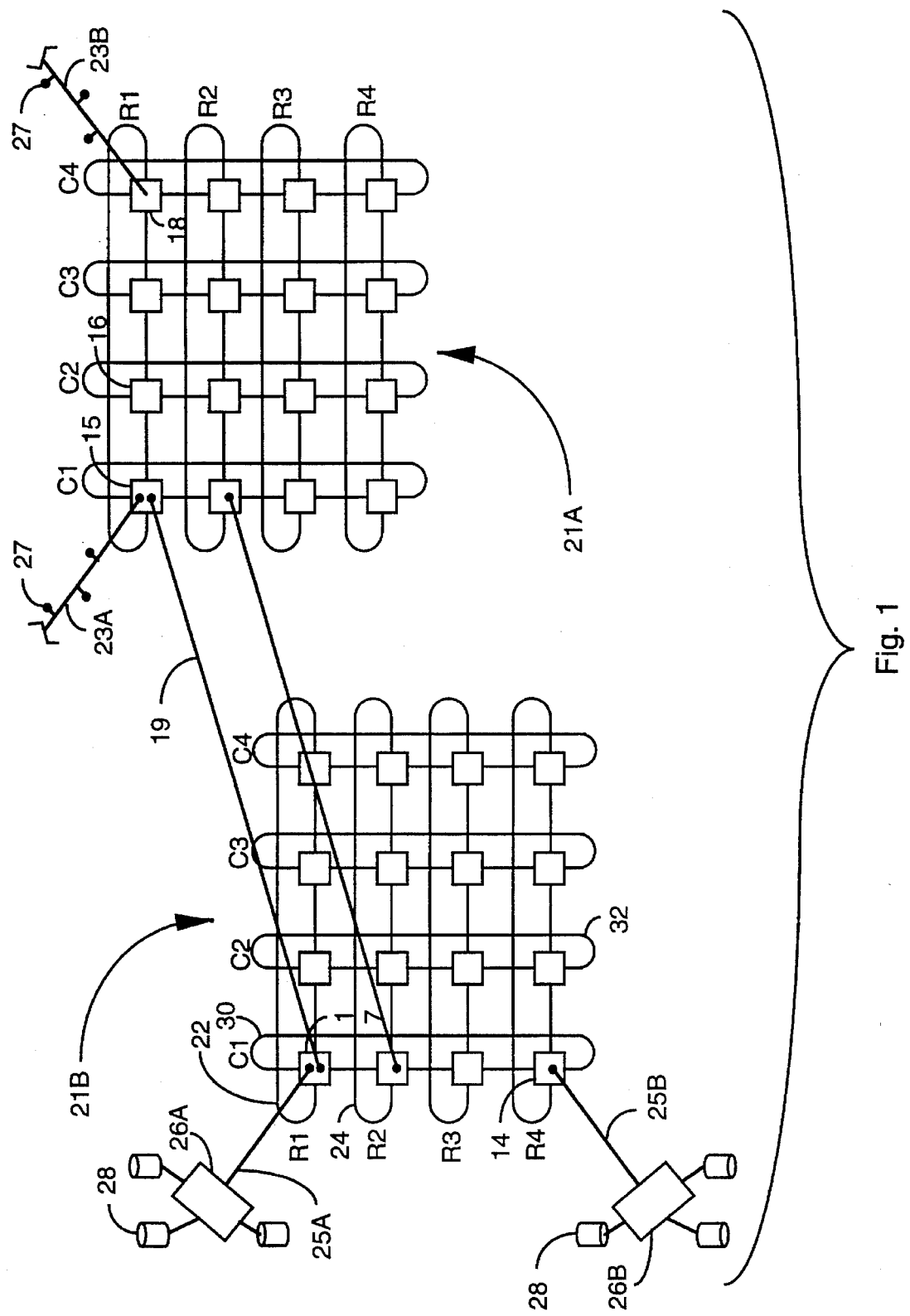
FIG. 1 is a diagrammatical illustration of a massively parallel network architecture according to an embodiment of the invention.

FIG. 1 is a diagrammatical illustration of a massively parallel network architecture according to an embodiment of the present invention. One matrix 21A comprises sixteen interconnected client nodes (CN). Another matrix 21B comprises sixteen resource nodes (RN). The illustrated four-by-four matrices are exemplary, and those with skill in the art will recognize that the matrix dimensions may vary. In many applications of massively parallel networks according to the present invention, the matrices will be much larger.

In the description of the network of FIG. 1, it is helpful to refer to the location of each client node and resource node by a matrix location CN(x,y) and RN(x,y) where x is a row number and y is a column number. In each array 21A and 21B in FIG. 1, the row and column numbers are labeled by numbers in parentheses. For example, node 15 has a matrix position 21A(1,1) and node 16 has a matrix position 21A(1, 2). In matrix 21B node 17 occupies position 21B{I,1).

In the embodiment illustrated by FIG. 1, matrix 21A functions as a client array and matrix 21B functions as a resource array. The distinction is by the nature of connections to the nodes in each array.

The nodes in the client array connect by communication links to client networks. Two such networks 23A and 23B having client stations such as stations 27 are shown connected to node 15 and to node 18. These client networks may be configured as any one of many local area network configurations known in the art, or remote network configurations implemented by such as telephone links. There are many known arrangements for connecting such client groups. In a full implementation, each client station in the client array connects to a client network. Also, there is no requirement that each client network be of the same form and nature.

In this embodiment, matrix 21B functions as a resource array. Resource nodes are connected by communication link to resource devices. One such connection 25A links resource node 17 at position 21B(1,1) to a hub 26A leading to resources shown as generic disk drives 28. A similar connection 25B is shown linking resource node 14 at position 21B(1,4) to a hub 26B connected to other generic resources 28. In a relatively simple implementation, each resource node is linked to a single resource, and in a full implementation, each resource node may be connected to a hub connecting several resources.

The system in this embodiment is massively parallel by virtue of the communication links between nodes. The nodes in each row in each array in this example are connected serially in a ring. For example, in matrix 21B, in row (1), node (1,1) is linked to node (1,2), which is linked to node (1,3), which is linked in turn to node (1,4). Node (1,4) is linked back to node (1,1), so the four nodes are linked in a ring 22. Similarly nodes (2,1), (2,2), (2,3) and (2,4) are connected in ring 24, and so on.

The nodes in each column are also serially ring connected in the same manner as described above for rows. For example, in matrix 21B, nodes (1,1), (2,1), (3,1), and (4,1) are connected in ring 30. Similarly the nodes of column 2 are ring connected in ring 32, and the nodes of column 3 and column 4 are similarly ring connected.

The unique connection scheme results in each node in the resource array being linked to each adjacent node in its row position and in its column position. By virtue of the ring nature of the connection, each node is connected by communication link to four other nodes in the array.

The row by row and column by column ring connection is duplicated in the client array 21A. To complete the massively parallel connectivity in this embodiment, each client node is connected to a resource node. In this embodiment the connection is by matrix position. For example, client node 15 at position 21A(1,1) is linked to resource node 17 at position 21B(1,1) by link 19. A similar link (not shown) is established between 21A(1,2) and 21B(1,2), between 21A(1,3) and 21B(1,3), and so on.

The communication flexibility of the system shown may be illustrated by following a request for data from any client station 27 on network 23A linked to client node 15 at position 21A(1,1). In this example the data request is for data stored at a resource device 28 on link 25B connected to resource node 14 at position 21B(4,1). From client node 15 the data request may be routed via any one of five branches, each of four to an adjacent client node, or to resource node 17 at position 21B(1,1) via link 19. In this example, assume the request is routed directly to the resource array via link 19, as might be preferable in a low-demand state.

At resource node 17 there are four choices for routing, one link to each of the four adjacent resource nodes. The fifth link, to resources on link 25A, is not an option, because the request is for data available only on link 25B. The most direct route, assuming the next node is not busy, is directly from resource node 17 to resource node 14, which is an adjacent node in ring 30. In considering alternative routing, the very large number of choices is immediately apparent.

Figure 2A:
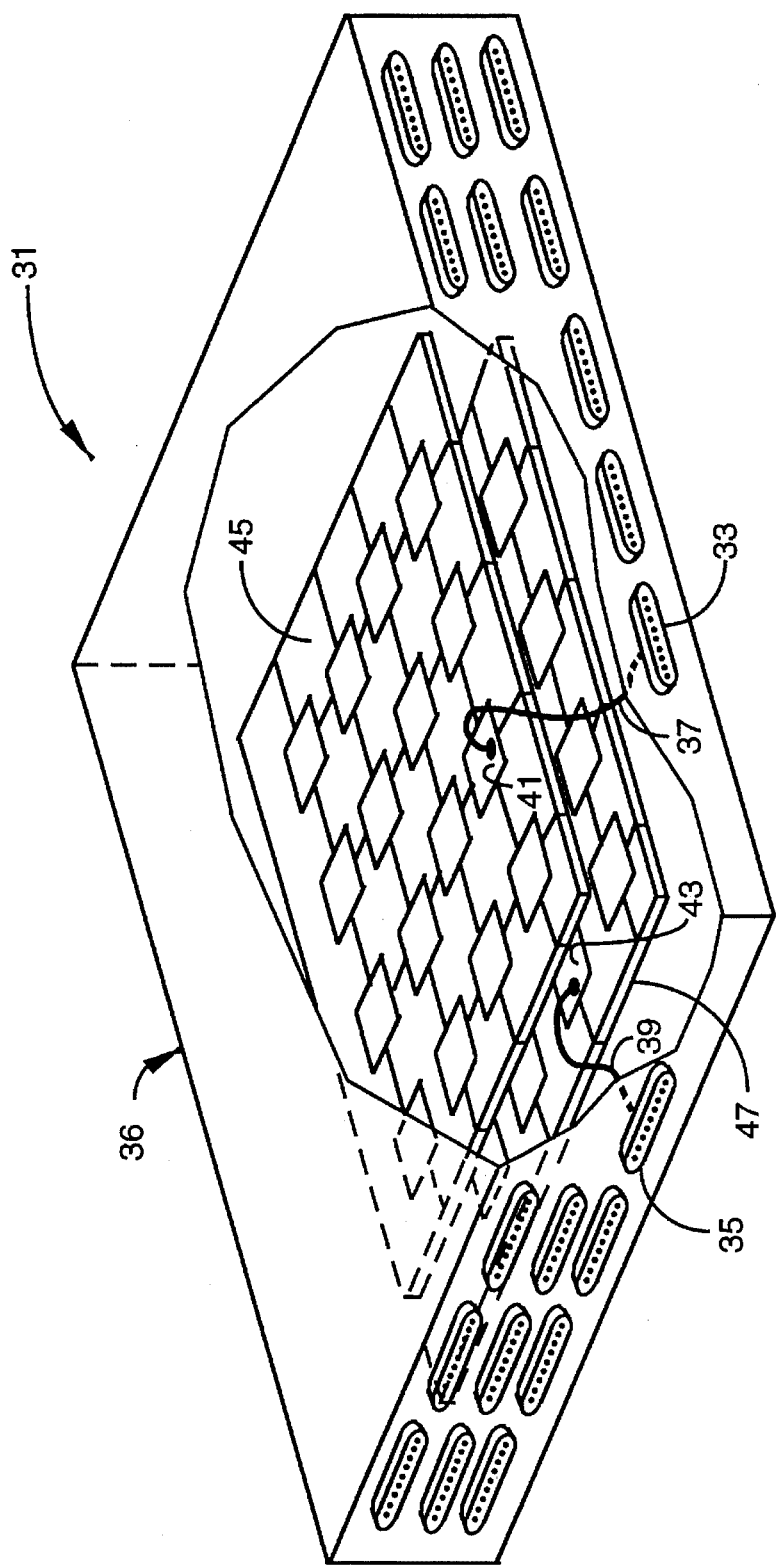
FIG. 2A is an isometric drawing of a massively parallel network device according to an embodiment of the invention.

FIG. 2A is an isometric view of a massively parallel network system substantially according to the arrangement described above with reference to FIG. 1. System 31 comprises two printed circuit boards (PCBs) 45 and 47, and each PCB comprises a matrix of integrated circuits (ICs) as nodes linked by communication links substantially as shown for the nodes of the arrays of FIG. 1. PCB 45 is a client array and PCB 47 is a resource array. Each IC node on each PCB comprises a microprocessor.

PCB 45 in this embodiment comprises 16 ICs in a 4×4 matrix, and PCB 47 comprises 16 ICs in a 4×4 matrix, just as in FIG. 1. IC 41 is located, for example, on client array PCB 45 at matrix position 45(4,2), and IC 43 is located on resource array 47 at matrix position 47(3,1). In this embodiment, the PCBs are supported in a case 36, and each IC node on each PCB has a dedicated bus port with a connector positioned in a wall of case 36. For example, IC 41, a client node on PCB 45, links to communication port 33 via bus 37, and IC 43, a resource node on PCB 47, links to resource port 35 via resource bus 39. There are 32 connectors, of which 16 are client network ports for connection to client networks, and 16 are resource ports for connecting to resources.

Those with skill in the art will recognize that the characteristics of the connectors will depend on the characteristics of the buses connected, and there are many choices in the art. There may be circuitry associated with each port for modulating between the data characteristics of each network or resource link and the associated bus to each IC in the system. System 31 may also comprises support circuitry for a conventional computerized system such as, but not limited to, a BIOS system and power supply. These elements are not shown in FIG. 2A.

In an alternative embodiment, system 31 also comprises circuitry to monitor each port for information management purposes such as determining the nature of the connection. For example, installed SCSI and/or Ethernet equipment. Also, it is not strictly required that there be a dedicated port for each IC node on both matrices. A lesser number of ports may be provided, with some ports serving more than a single node in the massively parallel architecture.

Figure 2B:
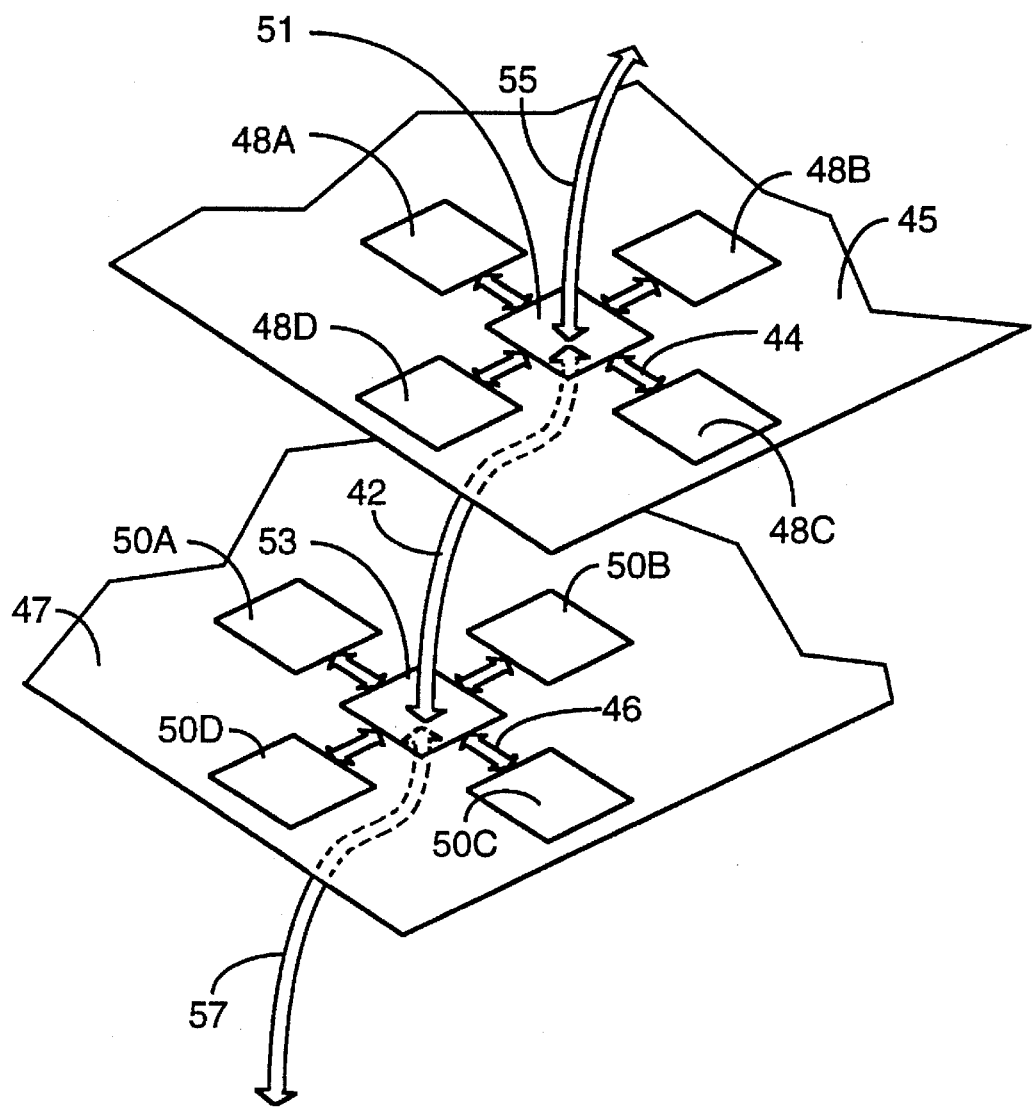
FIG. 2B is an isometric drawing of a portion of the network device of FIG. 2A.

FIG. 2B is a largely diagrammatical isometric illustration of a portion of each of PCBs 45 and 47 in the embodiment shown in FIG. 2A. Client node 51 on PCB 45 communicates via links 44 to the four adjacent nodes 48A, 48B, 48C and 48D. The links in one direction are a part of the row ring connection previously described, and the links in the other direction are a part of the column ring connection previously described.

Resource node 53 on PCB 47 communicates via links 46 to the four adjacent nodes 50A, 50B, 50C and 50D. Again the links in one direction are a part of the row ring connection previously described and the links in the other direction are a part of the column ring connection previously described. Links 44 and 46, and other links between nodes not shown, may be any one of a wide variety of known communication connection types, including, but not limited to parallel, serial and optical digital and/or analog transmission links. The necessary hardware and firmware for managing the communication at each node is a part of the circuitry at each node, and depends on the nature of the links. For example, if a communication link is a serial connection, the modulation and demodulation circuitry for converting digital data to and from the serial protocol is a part of the circuitry at each node. Also, although the nodes are described as single ICs, this structure is preferable and not required. Each node could as well be implemented in two or more ICs with connective traces and structure.

Although not explicitly shown in FIG. 2B, nodes 51 and 53 are an associated pair in the matrix geometry (see description of matrices above). That is, nodes 51 and 53 have the same (x,y) address on different arrays. Accordingly, these two nodes are connected by another communication link 42. Moreover, a client LAN 55 is connected to client node 51, and a resource link 57 is connected to resource node 53. Similar links, not shown, are made to the other resource nodes and client nodes in FIG. 2B. Although it is not required, in the preferred embodiment described, arrangement of the nodes in square matrix arrays on PCBs, and alignment of the PCBs, brings associated nodes in proximity for connection.

Figure 3:
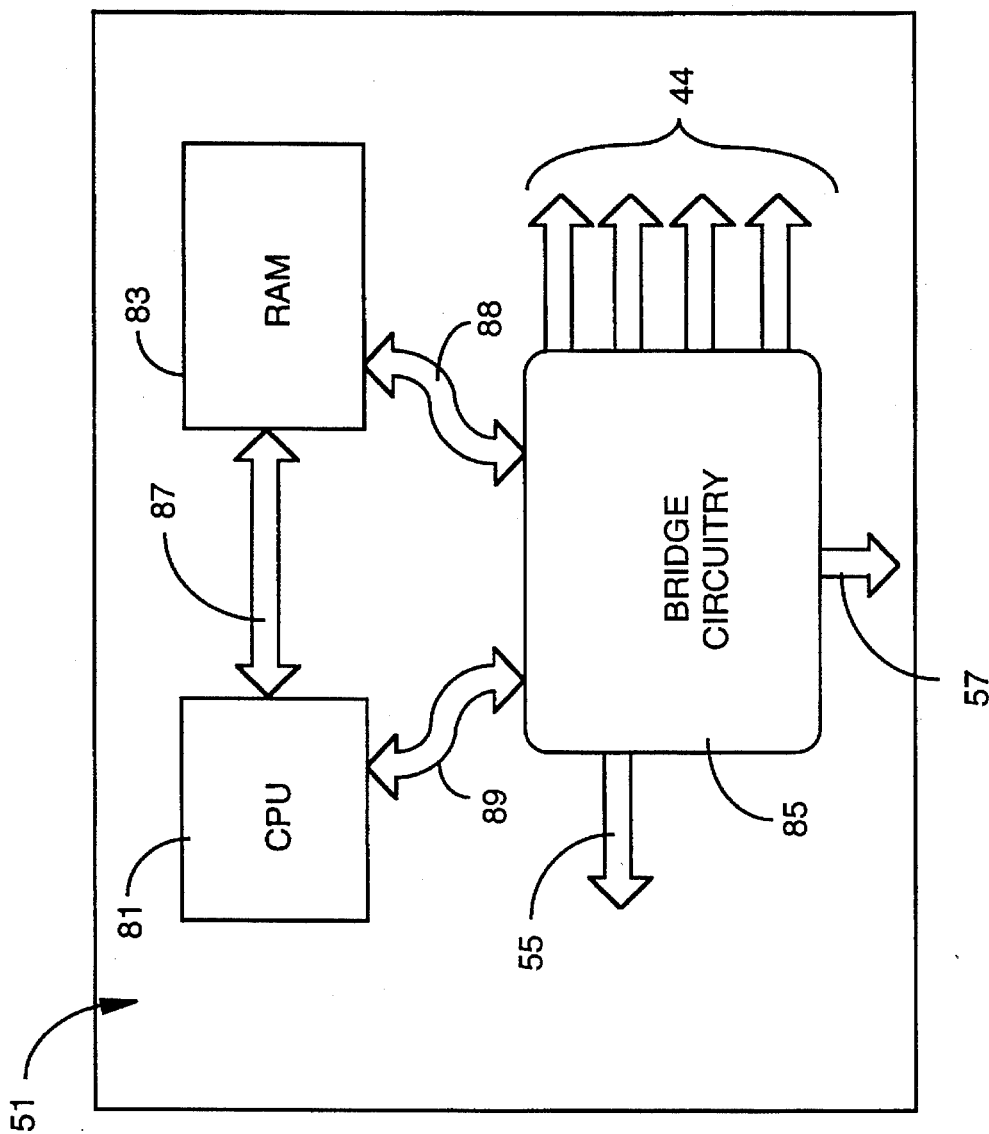
FIG. 3 is a plan view block diagram of a microprocessor node according to an embodiment of the invention.

FIG. 3 is a block diagram plan view of client node 51 according to a preferred embodiment of the present invention. The same drawing may represent resource node 53 and other nodes in either matrix. A node is a client node or a resource node by nature of connection to resources or clients, rather than by particular physical structure.

Node 51 comprises a CPU 81, a memory unit 83 and routing bridge circuitry 85. In this embodiment the memory unit is random access memory (RAM). It will be apparent to those with skill in the art that other types of electronic memory may be used as well.

Control routines stored in memory 83 are accessed and operated by CPU 81 to manage data flow and logical functions for the local node. Outputs from CPU 81 configure bridge circuitry 85 for routing requests and data in the network. In node 41, CPU 81 is linked to RAM 83 by bus 87 and to bridge 85 by bus 89. A third bus 88 in this embodiment links bridge circuitry 85 with memory 83. In one embodiment, bus 88 has an extra wide bandwidth.

Links 44 are links to adjacent nodes on the same PCB as described above. Link 55 is the link to a client LAN in this example via an outside connector, and link 57 is the link to an associated node in the resource array. In the case of a resource node, link 57 would be the link to a resource or a resource hub. An advantage of RAM at each node is that control routines may be accessed and updated, and orchestrated from outside computer equipment to provide for optimum operation.

An important purpose of the massively parallel architecture according to embodiments of the present invention is to provide resources from numerous points to client at numerous other points while minimizing delay and maximizing data flow rate. This is accomplished by providing a very large number of alternative paths (massive interconnection) for requests and data, and by providing intelligent nodes for routing the data and requests through the massively parallel architecture in an efficient manner. To accomplish this end, as stated and described above, each node has a microprocessor, thus machine intelligence, together with stored instructions and information for accomplishing efficient routing. It will be apparent to one with skill in the art that there are many alternative schemes for routing that may be used, and that the control routines might take any of a large number of forms.

In one embodiment, each node is provided with a map of clients and resources, detailing to which nodes the clients and resources directly connect. Moreover, in this embodiment, each node is "aware" of its own position in the network architecture.

The essential nature of much information to be routed through such a network is analog. For example, such networks are useful for routing television (video) programs from storage (resources) to clients on a network. The essential nature of the network and the nodes is digital. Although there are a number of ways data may be transmitted between nodes, such as parallel bus and serial link, the data is managed digitally at each node.

Figure 4:
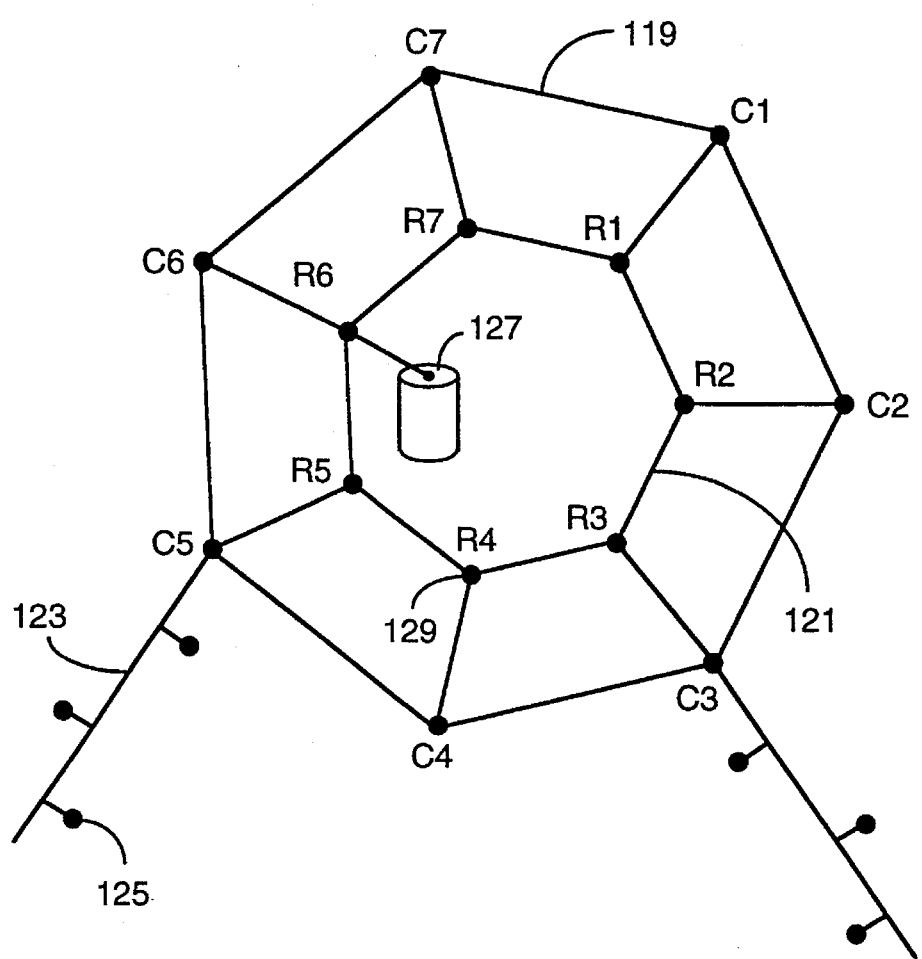
FIG. 4 is a two-dimensional view section through a massively-parallel network according to an embodiment of the invention.

Following the example of television networking for such as TV movies and other selective programming, FIG. 4 is a two-dimensional slice through a massively parallel network in an embodiment of the present invention, dedicated to providing TV movies to clients. The same diagram may represent a massively parallel network for many other applications. Ring 119 represents a portion of a client array, and ring 121 represents a portion of a resource array. The portion represented, in the terms of the above descriptions, could be either a single row or a single column in each array. Connections in each array in the third dimension are not shown for simplicity.

In FIG. 4, client nodes are labeled C1, C2, . . . C7, and resource nodes are labeled R1, R2, . . . R7. A client network 123 is connected to client node C5 and has a client 125 as a station on the network. A resource is represented as a hard-disk drive 127 connected to resource node R6. Although not shown to keep the diagram simple, there may be other resources connected to any of the resource nodes R1–R7, and to other resource nodes not shown. Also, other client networks may be connected to the client nodes C1–C7, and other client nodes not shown. Separate resources and clients can be connected in network fashion to nodes preferably only up to the ability of the transmission protocol on the client networks and resource branches to handle full load transfer without delay.

In the instant example, client 125 requests a movie stored at resource disk 127. Each client station has digital intelligence substantially configured like the node illustrated in FIG. 3, and described above. That is, each station has a microprocessor, a memory, sending and receiving circuitry for the client network, and control routines executable by the microprocessor to compose and transmit requests and to receive and process requested data.

Client 125 has a schedule of movies available, and an input apparatus for making a selection. When the client makes a selection, the digital system at the client station may consult a lookup table and assign a resource code to the transmission, or all selection transmissions may be sent to an account manager. One or more of the resource nodes, or even client nodes, may be assigned the task of account managing for the system. In this example resource node R4 is account manager 129.

The account manager has control routines for accounting and scheduling in addition to routing routines, and has location information for clients and resources on the massively parallel network. In the case of a single account manager, all the resources and clients are mapped at the single manager, and regular maintenance updates for changes in resources and clients (new clients subscribe, some discontinue the service, new movies become available, older movies may be discontinued). There may be more than one account manager to share the duty and reduce the load effect at a single manager.

In the case of a single account manager, the instant example, the client makes a selection, and the client station codes the data and transmits it on the client LAN to client node C5. The coded data includes one or more bits addressing the account manager, one or more bits identifying the client, and bits identifying the movie title requested. There may be other information, such as a particular time for transmission, or special information pertaining to charges, etc.

The general process at client node C5, and at other nodes as well, is that incoming transmissions are immediately stored in the node memory, along with priority association for re-transmission. Beyond C5 there is a wide choice of available paths to account manager 129. The necessary intelligence for routing is stored at each client and resource node. For example, from C5, there are two apparently equal "best choices" to R4 (account manager 129). One is to R5, then to R4. The other is to C4, then to R4. There may be some reason in particular implementations why one of these two choices is "best", in which case that path will carry the first priority. If there is no such, one or the other may be first priority arbitrarily.

In one embodiment, the means of routing is "run and shoot"; that is, the node having data for retransmission has test routines for testing the available alternatives by priority, and, on finding a path open, passes the transmission on to a next node. The destination code determines which of five connections (three are shown) is on the shortest, or best, path, and the CPU tests that connection. If the node at the other end is not busy, the request is immediately retransmitted and deleted from memory.

If R5–R4 is the highest priority path from C5 to R4, the CPU at C5 will first poll R5. If R5 is available, retransmission takes place; if it is not, the next node in priority is tested, and so forth, until the stored data for retransmission, in this case, client 125's request for a movie, is sent on.

In the case of requests from clients, routed to an account manager, each request is a short burst, typically a single data word of 16 or 32 bits, requiring only a very short transmission duration. In this case of transmission of information like a movie, the situation is somewhat different, as is described in more detail below.

It will be apparent to those with skill in the art that there is a broad variety of ways routing may be prioritized and determined. Substantially all are based on priority and testing of some sort.

When client 125's request for a movie arrives at account manager 129, the request is processed. Client 125's account is charged for the particular movie time requested, and the updated account is then available for whatever billing cycle is in use. The account manager also associates the material (movie) requested with the resource location, and initiates the process of sending the movie data to client 125's station.

The transmission of a command packet issued by the account manager to resource 127 via resource node R6 to cause the requested movie data to be transmitted to client 125 is similar to the transmission of the original request from client 125 to the account manager. The necessary information packet is rather small, requiring such as destination (node R6), movie ID on resource 127, time of transmission, and so forth. The routing of this command packet is accomplished by priority and testing, as described above. At R6 the command packet is stored and processed.

Figure 5:
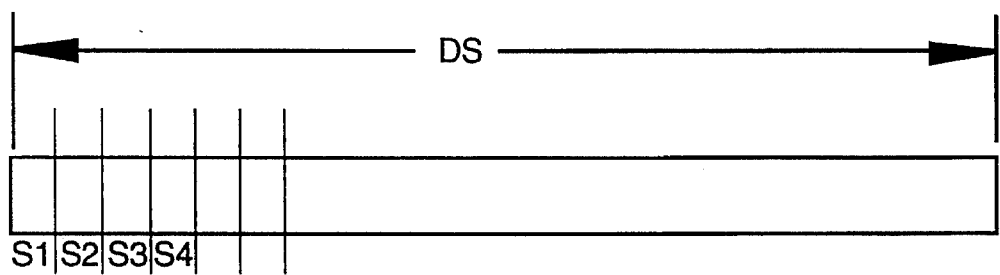
FIG. 5 is a diagram of a data stream representing video data comprising a movie.

The transmission of a complete movie, which may have a playing time measurable in hours instead of milliseconds, is a different proposition than transmission of a request or a command packet. FIG. 5 represents the total data length of a movie in transfer time of length DS. In disk 127 the total data string is stored in sectors, each providing, when processed, for example, 1 minute of viewing time of the movie. A movie of three hours length, then, would be stored and processed in 180 sectors S1, S2 . . . , S180. Initial sectors S1, S2, S3, S4, are indicated in FIG. 5. Each sector, although it represents a full minute of viewing time, can be transmitted in perhaps milliseconds as digital data from node to node in the massively parallel network, depending on the characteristics of the data paths and modes of transmission.

In the instant example, Node R6, having received the command packet from the account manager, executes the commands according to stored control routines. Node R6 retrieves a first sector (S1), stores that sector in its local memory, and transmits it on toward client 125 in the same manner as described above for routing requests and command packets. R6 continues to retrieve, store, and delete until it has sent along all of the sectors for the movie, after which it may (or may not) issue an acknowledgement to the account manager, depending on the vagaries of the particular protocol and application.

Given the massively parallel nature of the network, wherein each node has as many as four connections in the same array (resource or client), and one each to the opposite array, and either a resource trunk or a client LAN connection, there is no guarantee that consecutive sectors will follow a common path from resource 127 to client 125. Unless the loading is low, it is not likely. There is no need, however, for all of the sectors of the movie to follow one another in sequential fashion or even to arrive in order.

Each sector transmitted through the maze of the massively parallel network is coded (sector #, destination, etc.), and as each sector arrives at client LAN station 125, it is recorded in memory according to prearranged addresses. After at least one sector is available, the movie may begin, by converting the available data to video signals and transmitting the signals to the TV display. In most cases this is a CRT video tube, but that is not a requirement. As other types of displays (LCD, ELD, etc.) become more common for TV and high definition TV, the equipment at the client station can be updated to operate with the later apparatus.

Figure 6:
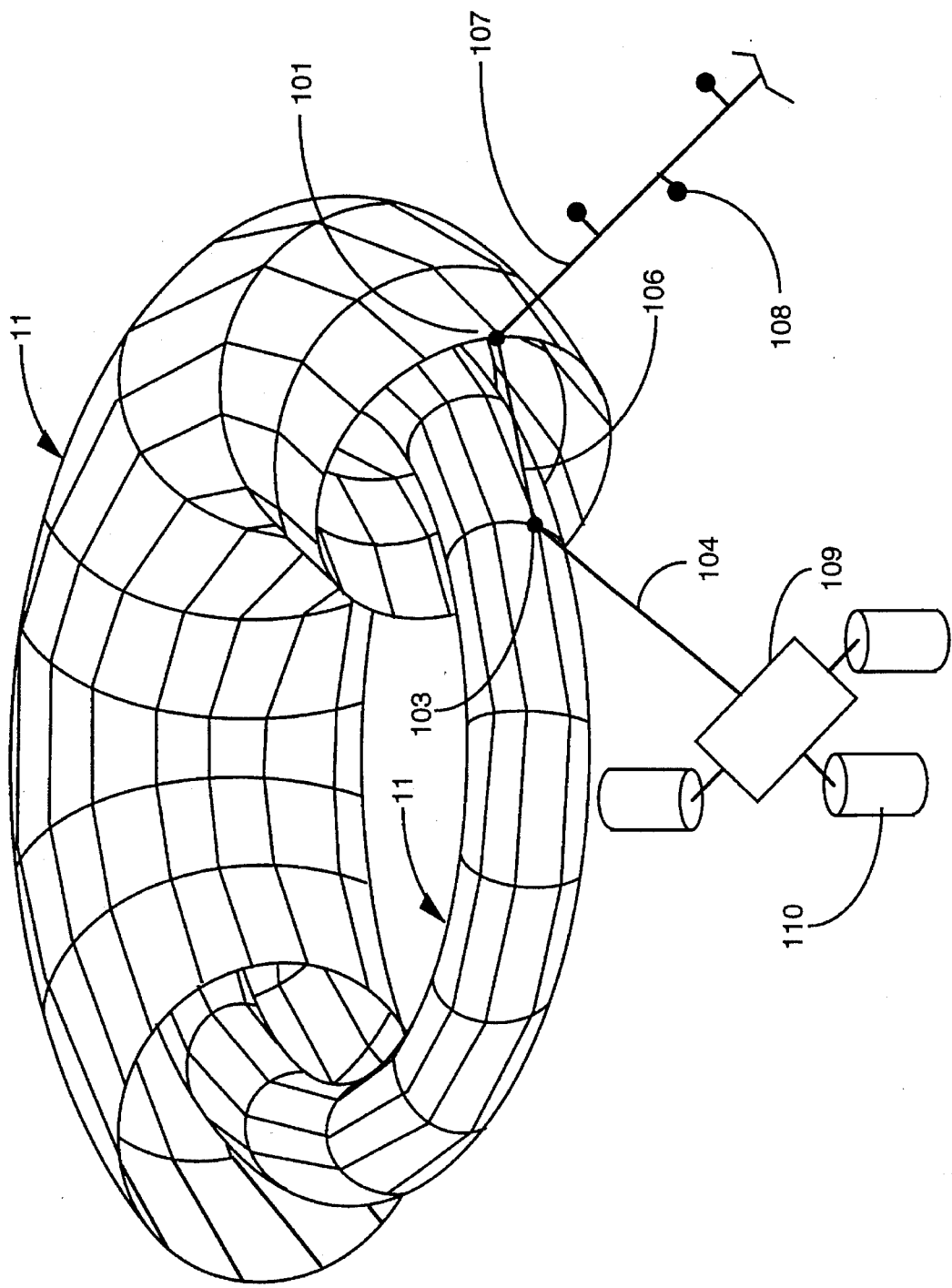
FIG. 6 is an isometric illustration of a massively parallel network according to an embodiment of the invention, configured as nested tori.

FIG. 6 is a massively parallel network according to an embodiment of the invention wherein the resource array and the client array are configured as nested tori. In this example the outer torus is a client array 11 and the inner torus is a resource array 13. Each intersection on client array 11 and resource array 13 is a node in the massively parallel network. In another embodiment the position of the client array and resource array may be reversed. The torus representation geometrically is equivalent to matrix array like that presented in FIG. 1. FIG. 6 is meant to illustrate the toroidal nature of the interconnecting geometry, ad no attempt has been made to match nodes by position or number.

In FIG. 6 a portion of the outer torus (client array) is shown cut away to illustrate the inner torus (resource array). A single client node 101 is shown connected to a single resource node 103 and to a client LAN 107 having at least one client station 108. Each client node is connected in two rings, one around the major diameter of the torus, and the other around the minor diameter, as is each resource node on the opposite torus array. Resource node 103 is connected to a resource hub 109 having at least one resource 110. These elements are exemplary and representative. Although not shown in FIG. 6, each resource node is connected to a client node and to a resource hub, and each client node is connected to a resource node and a client LAN.

It will be apparent to those with skill in the art that the nested torus arrangement is illustrative and not limiting. The same connectivity is illustrated in the matrix arrays of FIG. 1, wherein the node at the end of each row is connected back to the first node in the row, and the node at the bottom of each column is connected back to the node at the top of the column.

In one embodiment, the tori are configured as PCBs locally to fit inside a case 111 similar to the case illustrated and described with reference to FIG. 2A. Case 111 would have the required number of I/O ports equal to the total number of client nodes and resource nodes.

In this alternate embodiment of the invention, the massively parallel network architecture may be applied as a large transaction system in real time. For example, a banking system may be implemented by allocating client nodes to different local bank branches with dedicated communication trunks to tellers' workstations and ATM machines. ATM limits could be relaxed because each customer's balance may be updated quickly throughout the system. Massively parallel network architecture allows for flexibility in data resource configuration and allows for a large number of branch banks to maintain current transaction status.

In the transactional banking application described above, the resource array and the client array might both be local, perhaps as shown in FIG. 2A, or in some other local arrangement. In this case ther would be communication trunks from the local client nodes going to the different branch or ATM locations. In an alternative arrangement, the client nodes might be remotely located at the branch or ATM.

In another embodiment of the invention, massively parallel network architecture could manage large data flow in a paperless company. For example, a large business may have as many as 100 fax lines, each capable of generating a page of fax containing approximately 30 kilobits about every fifteen seconds. In this application, some client nodes may service several users' fax requests and some resource nodes may be dedicated to fax modems, attached telephone lines and media storage devices for storing faxes. In this configuration, a business can effectively manage fax flow, reducing the need for a large number of fax machines and telephone lines.

It will be apparent to one skilled in the art that there are many changes that might be made without departing from the spirit and scope of the invention. For example, any number of tori may be nested within one another and effectively interconnected by the addition of communication links. Massively parallel network systems according to embodiments of the invention can be reconfigured from without for different applications or to update data and operating protocol for an existing application.

In a further aspect of the invention, a massively parallel system may be re-configured at times of system expansion. A system-wide hashing control routine could redistribute resource locations according to results of tracked transactions to provide for optimal performance. In these and other applications and embodiments, massively parallel network architecture according to the invention can provide effective, real-time access for a large number of users.

In various embodiments within the spirit and scope of the invention, microprocessors of many sorts and manufacture may be used. The same variability applied to memories and auxiliary circuitry, such as routing circuitry. Nodes may be accomplished as single ASICs, as described in embodiments herein, or in more than one IC. Similarly the variability of programmed control routines is very great, and the means of prioritizing and routing is similarly variable within the spirit and scope of the invention.

There are many ways to geometrically arrange nodes for such a system as well. This variability is illustrated above by the representation of essentially the same system as two levels of matrix arrays, and as nested tori. But the physical arrangement and relationship of nodes to one another is not limited by any one of the suggested arrangements. The connectivity is the principle constraint. There are many other alternatives not herein discussed that still should be considered as within the spirit and scope of the invention.

What is claimed is:

1. A communication internetwork comprising:
   a client array of communication nodes each connectable by data transfer link to one or more client stations; and
   a resource array of communication nodes opposite the client array and having the same number of nodes as the client array, each resource node connectable by data transfer link to one or more resources;
   wherein each node in each array is connected by data transfer link to just one node in the opposite array, and to exactly four nodes in the same array.

2. An internetwork as in claim 1 wherein every communication node comprises a microprocessor and an electronic random access memory, and wherein every data transfer link at each node is coupled to the microprocessor and the memory at that node.

3. An internetwork as in claim 2 wherein each communication node comprises data routing circuitry operable by the microprocessor and interfaced to the data transfer links.

4. An internetwork as in claim 1 wherein the data transfer links between nodes are parallel buses.

5. An internetwork as in claim 1 wherein the data transfer links between nodes are serial links.

6. An internetwork as in claim 1 wherein the communication nodes are implemented as single integrated circuit (IC) chips or chip sets mounted on printed circuit boards, and the data transfer links between nodes are parallel buses on and between the printed circuit boards.

7. An internetwork as in claim 1 wherein the random access memory at each individual node comprises a topology map and an identifier for placing the individual node in the topography.

8. An internetwork as in claim 7 wherein one or more of the communication nodes are configured as addressable routing managers, for receiving client requests and locating and scheduling data transfers from resources to client stages.

9. An internetwork as in claim 8 wherein one or more of the communication nodes are configured as account managers, for tracking and recording data transactions from resources to clients.

10. An internetwork as in claim 6 wherein the printed circuit boards and data transfer links between nodes are housed in an enclosure, and connections to client stations and resource nodes are implemented as connectors through walls of the enclosure, there being one connector per node.

11. A communication internetwork as in claim 1 wherein all the nodes in each array and all of the data transfer links between nodes are implemented on a single application-specific integrated circuit.

12. A method for routing data between resources and client stations comprising steps of:
   connecting client stations in a plurality of individual client networks;
   connecting each individual client network to a data interface at a client communication node comprising a microprocessor, data routing circuitry, and a random access memory, the client communication nodes forming a client array of communication nodes;

forming a resource array of resource communication nodes having the same number of resource nodes as client nodes in the client array, each resource node comprising a microprocessor, data routing circuitry, and a random access memory;

connecting each client node to exactly four other client nodes by data transfer links and to just one resource communication node by a data transfer link; and connecting each resource node to exactly four other resource nodes by data transfer links and to just one resource trunk leading to addressable resources by a data transfer link.

13. The method of claim 12 wherein one or more of the communication nodes is configured as a routing manager, and wherein the one or more routing managers receive routing requests from client stations and route data through the networks based on real time busy status of data links between nodes.

* * * * *